(12) United States Patent
Folger et al.

(10) Patent No.: US 11,898,718 B2
(45) Date of Patent: *Feb. 13, 2024

(54) VEHICLE LIGHTING ASSEMBLY WITH LENS HEATING DEVICE AND RECEPTACLE CONNECTOR ASSEMBLY FOR SAME

(71) Applicant: Antaya Technologies Corporation, Warwick, RI (US)

(72) Inventors: Tyler Folger, Warren, RI (US); Stefanie Merry, Barrington, RI (US); M. Jarod Scherer, Wakefield, RI (US); Stephen C. Antaya, Richmond, RI (US)

(73) Assignee: ANTAYA TECHNOLOGIES CORPORATION, Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,333

(22) Filed: Dec. 21, 2021

(65) Prior Publication Data

US 2022/0112999 A1 Apr. 14, 2022

Related U.S. Application Data

(63) Continuation of application No. 16/561,327, filed on Sep. 5, 2019, now Pat. No. 11,236,884.

(51) Int. Cl.
*H05B 3/06* (2006.01)
*H05B 3/84* (2006.01)
(Continued)

(52) U.S. Cl.
CPC .............. *F21S 45/60* (2018.01); *B60S 1/026* (2013.01); *F21V 21/002* (2013.01); *H01R 11/12* (2013.01);
(Continued)

(58) Field of Classification Search
None
See application file for complete search history.

(56) References Cited

U.S. PATENT DOCUMENTS 3,289,200 A 11/1966 Rueger
6,607,409 B2 8/2003 Machado
(Continued)

FOREIGN PATENT DOCUMENTS

CN 102400990 A 4/2012
CN 102694298 A 9/2012
(Continued)

OTHER PUBLICATIONS

KR20180093487A, Aug. 2018, Park et al., Bib.data sheet (Year: 2018).*
(Continued)

*Primary Examiner* — Joseph M. Pelham
(74) *Attorney, Agent, or Firm* — Billion & Armitage (57) ABSTRACT

A lighting assembly is presented herein. The lighting assembly includes a receptacle terminal having a connection portion defining an aperture configured to receive a corresponding plug terminal along a longitudinal axis and a terminal housing defining an opening and a cavity in which the connection portion is disposed. The connection portion is sized, shaped, and arranged within the cavity to be movable along a lateral axis perpendicular to the longitudinal axis.

19 Claims, 11 Drawing Sheets

(51) Int. Cl.
    *B60S 1/02*     (2006.01)
    *F21V 21/002*     (2006.01)
    *H01R 12/75*     (2011.01)
    *H01R 12/91*     (2011.01)
    *H01R 13/11*     (2006.01)
    *H01R 13/631*     (2006.01)
    *H01R 4/26*     (2006.01)
    *F21S 45/60*     (2018.01)
    *H01R 11/12*     (2006.01)
    *H05B 3/08*     (2006.01)
    *B60Q 1/00*     (2006.01)

(52) U.S. Cl.
    CPC ....... *H01R 13/111* (2013.01); *H01R 13/6315* (2013.01); *H05B 3/06* (2013.01); *H05B 3/08* (2013.01); *B60Q 1/0017* (2013.01); *H01R 2201/00* (2013.01); *H01R 2201/26* (2013.01); *H05B 2203/016* (2013.01)

(56) References Cited

U.S. PATENT DOCUMENTS

| | | | | |
|---|---|---|---|---|
| 8,342,867 | B2* | 1/2013 | Murphy | B82Y 35/00 |
| | | | | 439/248 |
| 9,623,790 | B2 | 4/2017 | Van Straten | |
| 9,709,238 | B2 | 7/2017 | Dunn et al. | |
| 10,046,692 | B2 | 8/2018 | Van Straten | |
| 10,272,877 | B2 | 4/2019 | Lesmeister et al. | |
| 11,066,047 | B1* | 7/2021 | Keller | H05B 3/84 |
| 11,236,884 | B2* | 2/2022 | Folger | B60S 1/026 |
| 11,384,919 | B2* | 7/2022 | Ting | F21V 29/90 |
| 2003/0162415 | A1* | 8/2003 | Spaulding | H05B 3/84 |
| | | | | 439/34 |
| 2006/0061139 | A1* | 3/2006 | Mochizuki | F21S 45/60 |
| | | | | 296/201 |
| 2007/0190849 | A1* | 8/2007 | Yamamoto | F21S 41/192 |
| | | | | 439/505 |
| 2011/0044065 | A1* | 2/2011 | Ohtani | F21S 45/60 |
| | | | | 264/272.11 |
| 2011/0062146 | A1* | 3/2011 | Kuriki | H05B 3/84 |
| | | | | 428/131 |
| 2011/0134655 | A1* | 6/2011 | Ohtani | F21V 3/00 |
| | | | | 977/932 |
| 2012/0040553 | A1 | 2/2012 | Tashiro | |
| 2013/0237077 | A1* | 9/2013 | Aono | H01R 13/4538 |
| | | | | 439/137 |
| 2015/0252996 | A1* | 9/2015 | Kadijk | F21K 9/64 |
| | | | | 362/249.02 |
| 2016/0363286 | A1 | 12/2016 | Deering | |
| 2017/0313235 | A1 | 11/2017 | Faoucher et al. | |
| 2019/0306926 | A1* | 10/2019 | Deering | H05K 1/0274 |
| 2019/0356063 | A1* | 11/2019 | Bennett | H01Q 1/1271 |
| 2021/0148539 | A1* | 5/2021 | Ting | F21S 41/148 |
| 2022/0221126 | A1* | 7/2022 | Hartenstein | B60Q 1/0023 |
| 2022/0399683 | A1* | 12/2022 | Asano | H01R 24/50 |
| 2023/0038551 | A1* | 2/2023 | Gonzalez | B60S 1/026 |

FOREIGN PATENT DOCUMENTS

| | | | |
|---|---|---|---|
| DE | 102006060516 A1 | 6/2008 | |
| EP | 1016818 A2 | 7/2000 | |
| EP | 2808950 A1 | 12/2014 | |
| EP | 3168941 A2 | 5/2017 | |
| EP | 3339726 A1 | 6/2018 | |
| FR | 2796764 A1 | 1/2001 | |
| JP | H10109587 A | 4/1998 | |
| JP | 2003136956 A | 5/2003 | |
| JP | 2006032137 A | 2/2006 | |
| KR | 20180093487 A * | 8/2018 | ............... B60R 1/12 |
| WO | 9716868 A1 | 5/1997 | |

OTHER PUBLICATIONS

European Search Report for EP Application No. 20194032.7, dated Nov. 20, 2020, 11 pages.

* cited by examiner

VEHICLE LIGHTING ASSEMBLY WITH LENS HEATING DEVICE AND RECEPTACLE CONNECTOR ASSEMBLY FOR SAME

CROSS-REFERENCE TO RELATED APPLICATION

This application is a divisional application under 35 U.S.C. § 120 of co-pending U.S. patent application Ser. No. 16/561,327, filed Sep. 5, 2019, the entire disclosure of which is hereby incorporated by reference.

TECHNICAL FIELD OF THE INVENTION

The invention generally relates to a lighting assembly for a vehicle, particularly a lighting assembly having a device configured to heat a lens of the lighting assembly.

BACKGROUND OF THE INVENTION

Many vehicles have lighting systems that include some form of a head lamps, tail lamps, and side marking lamps. Lighting systems that use incandescent or HID bulbs, for example, generate sufficient waste heat so that snow and/or ice does not form or stick on lenses of the lighting system when the ambient temperature is below the freezing temperature of water. Snow or ice on the lens of the lighting system may reduce luminous transmittance of the lens, thereby degrading the performance of the lighting system. Some lighting systems, such as those using light emitting diode (LED) bulbs, do not generate sufficient waste to heat melt ice or snow on the lighting system lens due to their energy efficiency.

Therefore, what is needed are improved systems and methods to sufficiently heat a lighting system lens to melt snow and ice to avoid reducing luminous transmittance of the lighting system lens.

BRIEF SUMMARY OF THE INVENTION

According to one embodiment of the invention, a lighting assembly is provided. The lighting assembly includes a receptacle terminal having a connection portion defining an aperture configured to receive a corresponding plug terminal along a longitudinal axis and an attachment portion configured to attach the receptacle terminal to a wire. The lighting assembly also includes a terminal housing defining a first oval-shaped opening and an oval-shaped cavity in which the connection portion is disposed. The connection portion is sized, shaped, and arranged within the cavity to be movable along a lateral axis perpendicular to the longitudinal axis. The lighting assembly further includes a terminal housing cover defining a second oval-shaped opening attached to the terminal housing, thereby enclosing the connection portion.

In an example embodiment having one or more features of the lighting assembly of the previous paragraph, a slot is formed between the terminal housing and the terminal housing cover through which the attachment portion extends.

In an example embodiment having one or more features of the lighting assembly of the previous paragraph, the connection portion is characterized as having a circular ring shape.

In an example embodiment having one or more features of the lighting assembly of the previous paragraph, the attachment portion is angularly offset relative to the connection portion.

In an example embodiment having one or more features of the lighting assembly of the previous paragraph, the attachment portion is arranged at a 45 degree angle relative to the connection portion.

In an example embodiment having one or more features of the lighting assembly of the previous paragraph, the connection portion defines a contact spring configured to exert a contact force on the corresponding plug terminal.

In an example embodiment having one or more features of the lighting assembly of the previous paragraph, the lighting assembly further includes a lens covering a light source, a resistive circuit disposed on a surface of the lens, and a post terminal connected to the resistive circuit. The post terminal is the corresponding plug terminal described above.

In an example embodiment having one or more features of the lighting assembly of the previous paragraph, the light source comprises a light emitting diode.

In an example embodiment having one or more features of the lighting assembly of the previous paragraph, the post terminal has a cylindrical body and a rounded tip.

In an example embodiment having one or more features of the lighting assembly of the previous paragraph, the connection portion defines a plurality of contact springs arranged about the aperture configured to exert a contact force on the post terminal.

In an example embodiment having one or more features of the lighting assembly of the previous paragraph, the post terminal is soldered to the resistive circuit.

In an example embodiment having one or more features of the lighting assembly of the previous paragraph, the lens has a luminous transmittance greater than or equal to 0.9.

In an example embodiment having one or more features of the lighting assembly of the previous paragraph, the terminal housing and the terminal housing cover are integrally formed.

In an example embodiment having one or more features of the lighting assembly of the previous paragraph, a hinge is disposed between the terminal housing and the terminal housing cover.

In an example embodiment having one or more features of the lighting assembly of the previous paragraph, the light source comprises a light emitting diode.

In an example embodiment having one or more features of the lighting assembly of the previous paragraph, the lighting assembly further includes a pair of the receptacle terminals, a pair of the terminal housings, a pair of the terminal housing covers, and a pair of the post terminals.

In an example embodiment having one or more features of the lighting assembly of the previous paragraph, the lens is characterized as having a round shape and a first post terminal of the pair of the post terminals is arranged radially opposite a second post terminal of the pair of the post terminals.

According to another embodiment of the invention, a receptacle connector assembly is provided. The receptacle connector assembly includes a receptacle terminal having a ring-shaped connection portion defining a central aperture configured to receive a corresponding plug terminal along a longitudinal axis and an attachment portion configured to attach the receptacle terminal to a wire. The receptacle connector assembly also includes a terminal housing defining a first oval-shaped opening and an oval-shaped cavity in which the connection portion is disposed. The connection portion is sized, shaped, and arranged within the cavity to be movable along a lateral axis perpendicular to the longitudinal axis. The receptacle connector assembly further includes a terminal housing cover defining a second oval-shaped opening attached to the terminal housing, thereby enclosing the connection portion. The first oval-shaped opening is aligned with the second oval-shaped opening.

In an example embodiment having one or more features of the receptacle connector assembly of the previous paragraph, a slot is formed between the terminal housing and the terminal housing cover through which the attachment portion extends.

In an example embodiment having one or more features of the receptacle connector assembly of the previous paragraph, the attachment portion is angularly offset relative to the connection portion.

In an example embodiment having one or more features of the receptacle connector assembly of the previous paragraph, the attachment portion is arranged at a 45 degree angle relative to the connection portion.

In an example embodiment having one or more features of the receptacle connector assembly of the previous paragraph, the connection portion defines a contact spring configured to exert a contact force on the corresponding plug terminal.

In an example embodiment having one or more features of the receptacle connector assembly of the previous paragraph, the connection portion defines a plurality of contact springs surrounding the central aperture configured to exert a contact force on the corresponding plug terminal.

In an example embodiment having one or more features of the receptacle connector assembly of the previous paragraph, the terminal housing and the terminal housing cover are integrally formed.

In an example embodiment having one or more features of the receptacle connector assembly of the previous paragraph, a hinge is disposed between the terminal housing and the terminal housing cover.

BRIEF DESCRIPTION OF THE SEVERAL VIEWS OF THE DRAWING

The present invention will now be described, by way of example with reference to the accompanying drawings, in which.

In the preceding drawings and in the following description, similar elements share the last two reference numbers.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
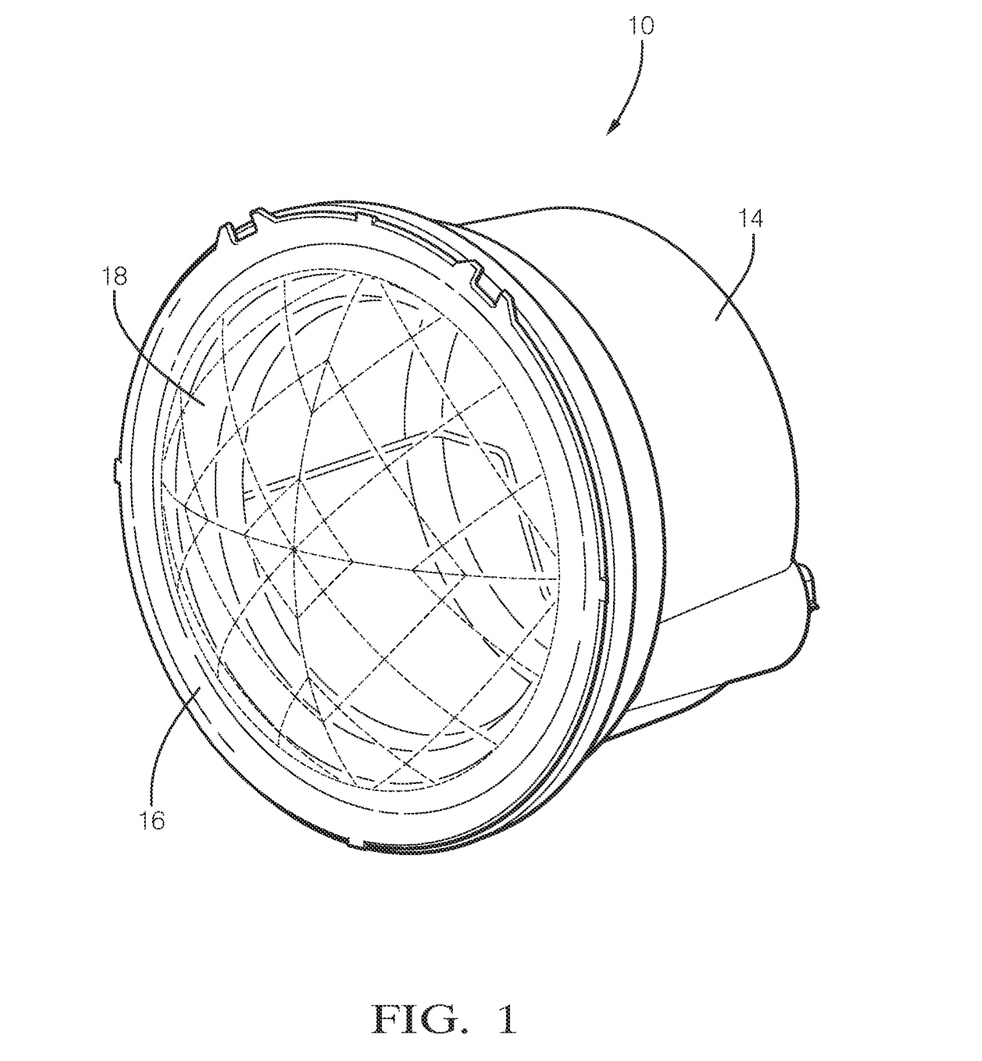
FIG. 1 is a perspective view of a lighting assembly according to a first embodiment of the invention.
Figure 2:
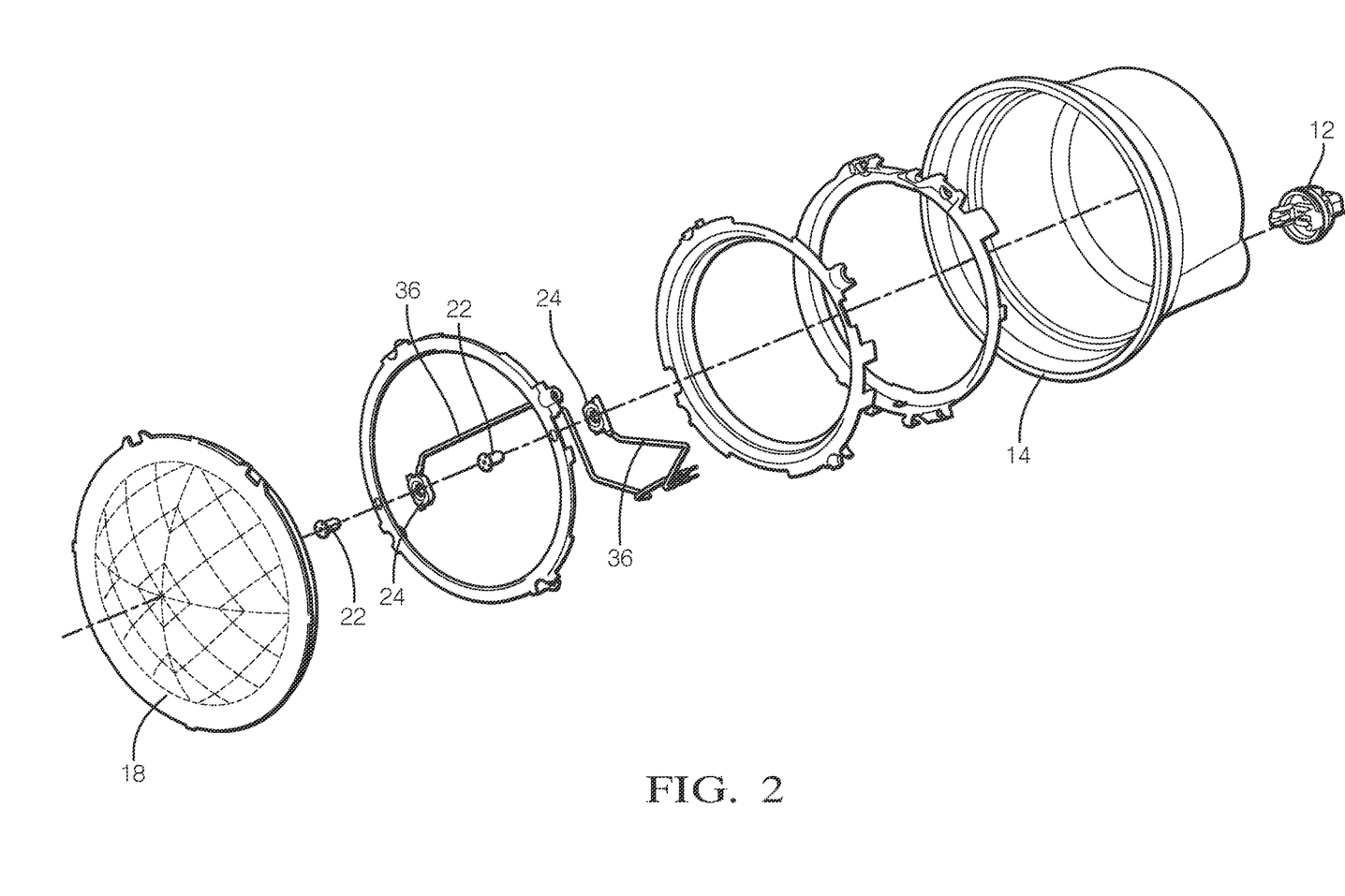
FIG. 2 is an exploded view of the lighting assembly of FIG. 1 according to the first embodiment of the invention.
Figure 3:
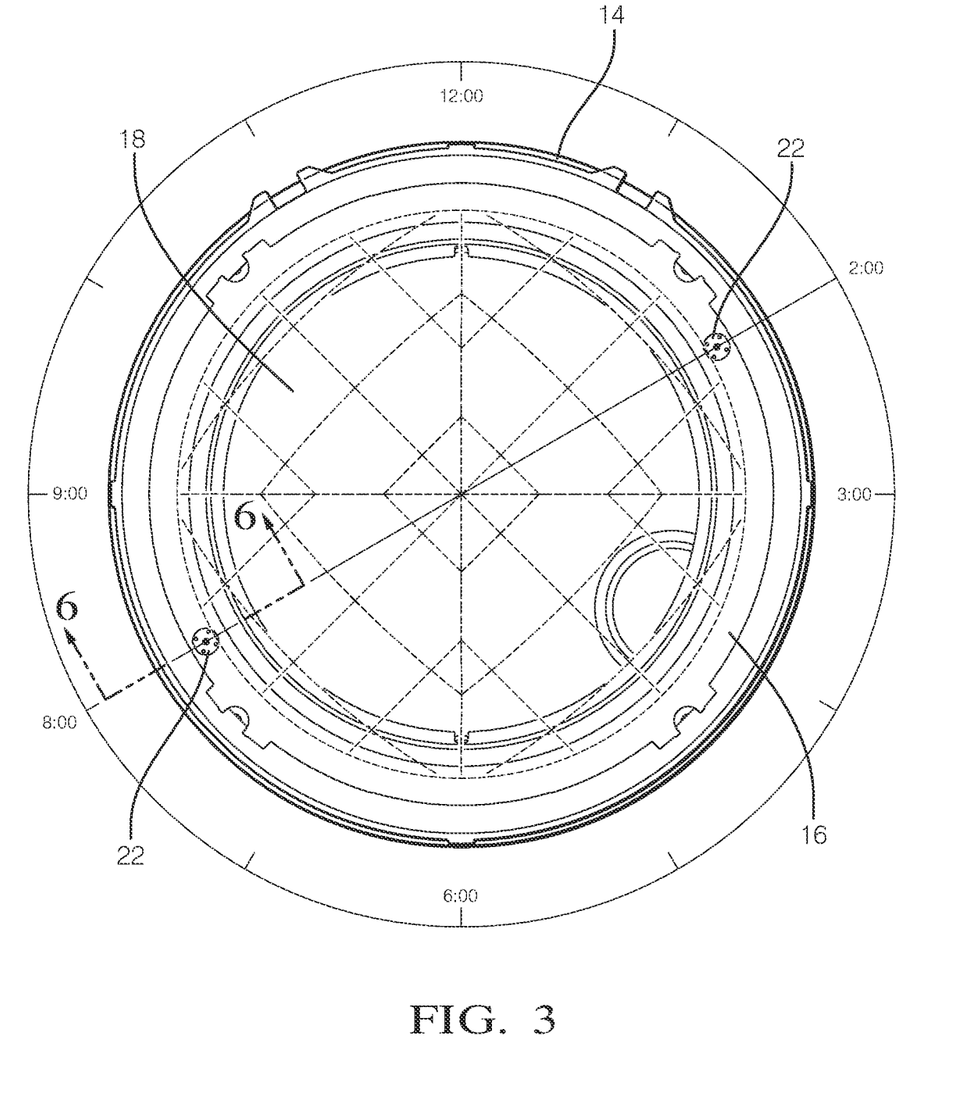
FIG. 3 is a front view of the lighting assembly of FIG. 1 according to the first embodiment of the invention.

FIGS. 1 to 3 illustrate a non-limiting example of lighting assembly 10, e.g., a motor vehicle headlight. The lighting assembly 10 includes a light source or lamp 12, in this example a light emitting diode (LED) array. The LED lamp 12 is disposed within a lamp housing 14. As best shown in FIG. 1, a lens 16 encloses the lamp 12 within the lamp housing 14. As best shown in FIG. 3, the lens 16 has a resistive heating circuit 18 disposed on a surface of the lens 16 that is heated by an electric current flowing through the heating circuit 18 to heat the lens 16 to remove ice and/or snow from the lens 16. In the illustrated example of a headlight, the lens 16 has a luminous transmittance greater than or equal to 0.9. The lighting assembly 10 also includes an electrical connector assembly 20 to provide an electrical current to the heating circuit 18 on the lens 16. The connector assembly 20 includes a pair of male post terminals 22 attached to the lens 16 and a pair of female receptacle terminal assemblies 24 configured to mate with the male post terminals 22. The lighting assembly 10 also includes a number of retaining rings to secure the lens 16 to the lamp housing 14 and the receptacle terminal assemblies 24 within the lamp housing 14.

Figure 4A:
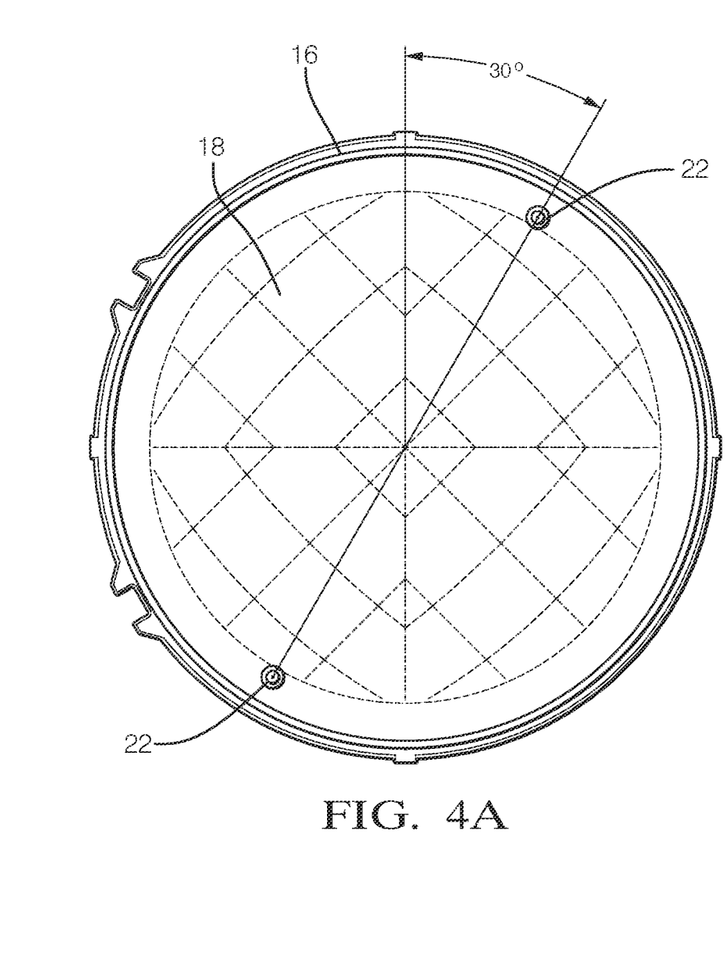
FIG. 4A is a front view of a lens of the lighting assembly of FIG. 1 according to the first embodiment of the invention.
Figure 4B:
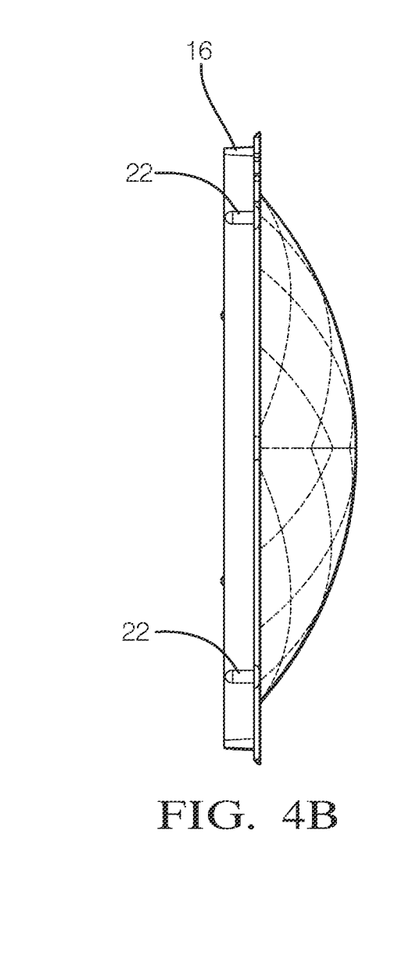
FIG. 4B is a side view of the lens of FIG. 4A according to the first embodiment of the invention.

FIGS. 4A and 4B show the lens 16. The heating circuit 18 is arranged on the inner surface of the lens 16 and contains a number of radial elements and concentric elements. The heating circuit 18 may be formed on the lens 16 by a screen printing process, a pad printing process or by depositing the circuit material on the lens 16 using a robotically controlled dispenser. The lens 16 may be formed of a glass or polymeric material. The post terminals 22 are attached to connection pads in the heating circuit 18. The post terminals 22 may be attached to the heating circuit 18 using a low temperature solder. Alternatively, the post terminals 22 may be attached to the heating circuit 18 using an electrically conducive adhesive, spin welding, or other materials and processes suitable for connecting a metal terminal to a circuit material disposed on glass or polymer. In the example lighting assembly 10 illustrated in FIGS. 1-3, the lens 16 is characterized as having a round shape and a first post terminal 22 is arranged at a two o'clock position which is radially opposite a second post terminal 22 arranged at an eight o'clock position.

Figure 5:
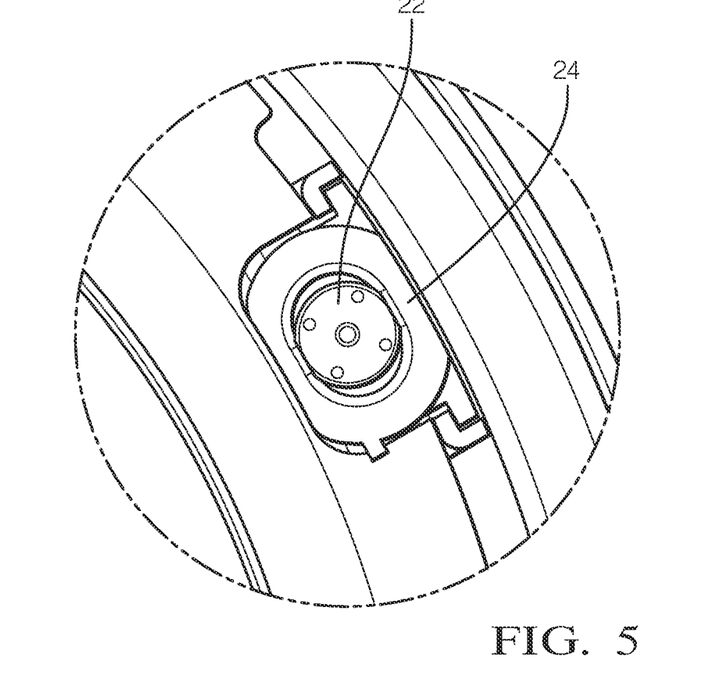
FIG. 5 is an isolated top view of an electrical connector assembly of the lighting assembly of FIG. 1 according to the first embodiment of the invention.
Figure 6:
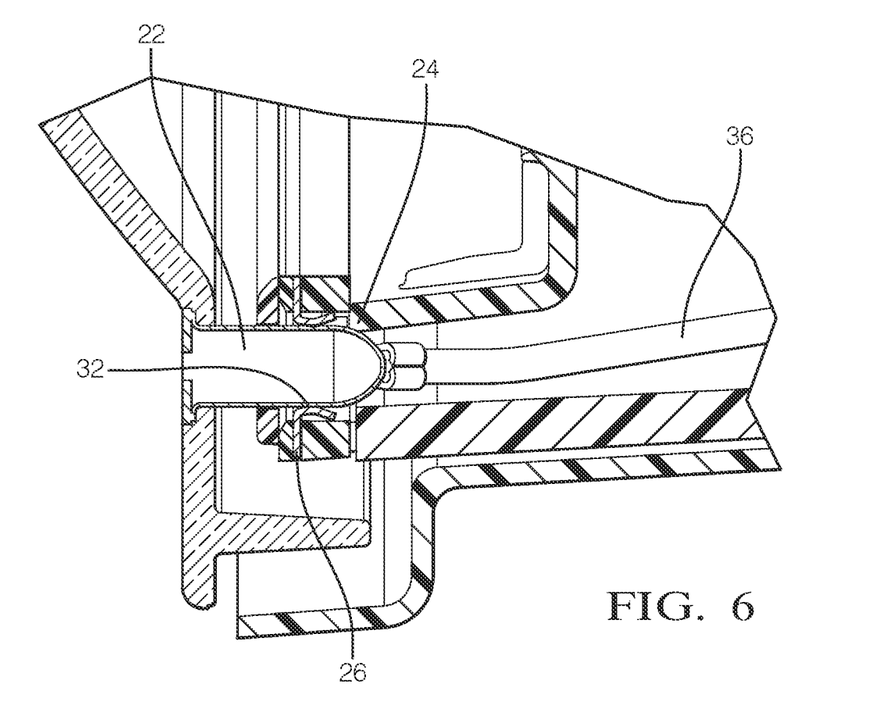
FIG. 6 is cross section view of the electrical connector assembly of FIG. 5 according to the first embodiment of the invention.
Figure 7:
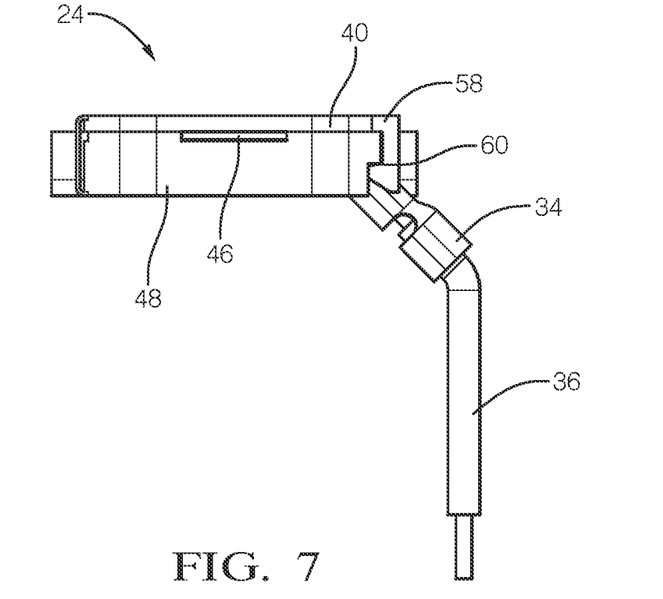
FIG. 7 is a side view of a female receptacle terminal assembly of the electrical connector assembly of FIG. 5 according to the first embodiment of the invention.
Figure 8:
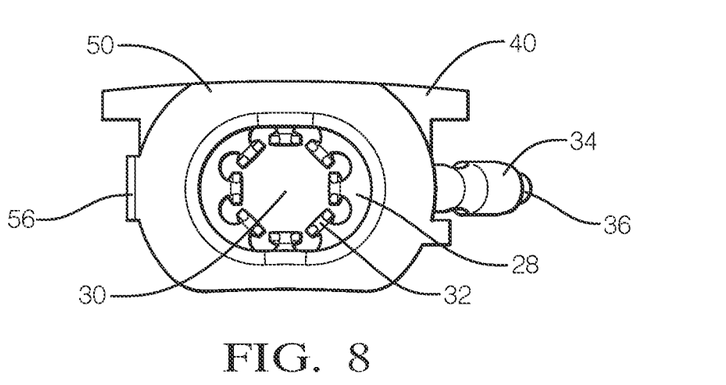
FIG. 8 is a top view of the female receptacle terminal assembly of FIG. 7 according to the first embodiment of the invention.
Figure 9:
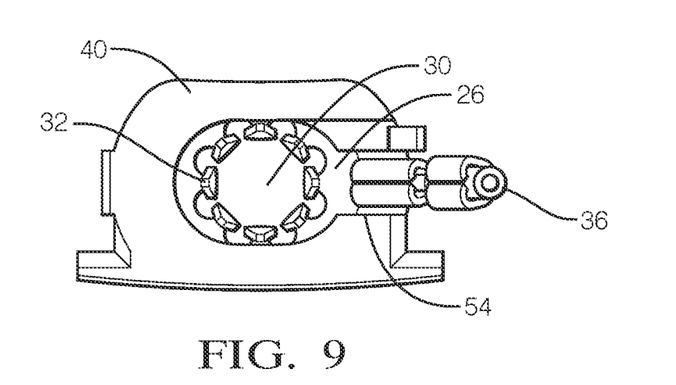
FIG. 9 is a bottom view of the female receptacle terminal assembly of FIG. 7 according to the first embodiment of the invention.

FIGS. 5 and 6 illustrate the connector assembly 20 as it is installed within the lighting assembly 10. The male post terminal 22 on the lens 16 is received within a female receptacle terminal 26 of the receptacle terminal assembly 24, thereby providing an electrical connection to the heating circuit 18 on the lens 16.

FIGS. 7-12 illustrate the receptacle terminal assembly 24 which includes the receptacle terminal 26 that is formed from sheet metal, e.g., plated brass sheet stock. The receptacle terminal 26 has a ring-shaped connection portion 28 that defines a central aperture 30 in which the post terminal 22 is received along a longitudinal axis. The connection portion 28 defines a plurality of arcuate contact spring 32 surrounding the central aperture 30 that is configured to exert a contact force on the corresponding post terminal 22. The receptacle terminal 26 also includes an attachment portion 34 that is configured to attach the receptacle terminal 26 to an electrical wire 36. The attachment portion 34 is angularly offset relative to the connection portion 28. In the illustrated example, the attachment portion 34 is arranged at a 45 degree angle relative to the connection portion 28.

Figure 10:
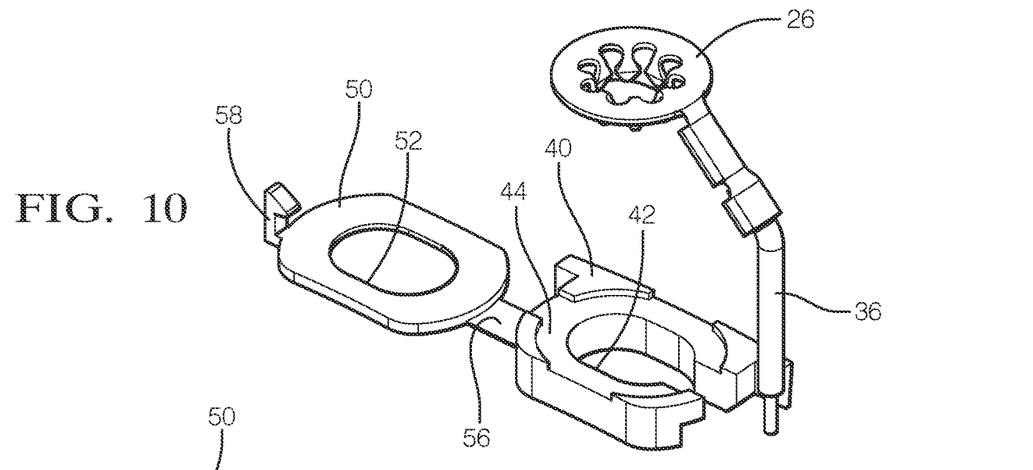
FIG. 10 is an exploded view of the female receptacle terminal assembly of FIG. 7 according to the first embodiment of the invention.
Figures 11, 12:
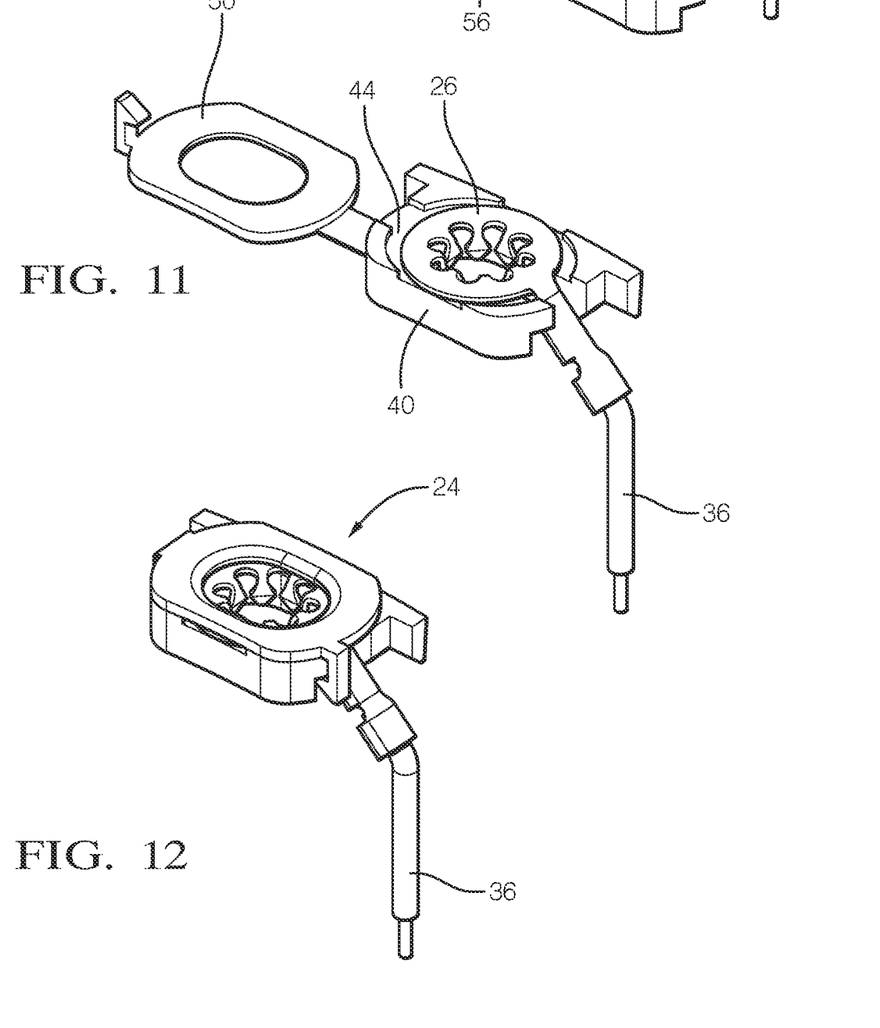
FIG. 11 is a perspective view of the female receptacle terminal assembly of FIG. 7 in a partially assembled condition according to the first embodiment of the invention.
FIG. 12 is a perspective view of the female receptacle terminal assembly of FIG. 7 in a fully assembled condition according to the first embodiment of the invention.

The illustrated attachment portion 34 include a pair of crimp wings 38 that are crimped to the wire 36. Alternative embodiments of the attachment portion 34 may be envisioned that have a tubular section configured to be soldered to the wire 36 or a flat section to which the wire 36 may be sonically welded. The receptacle terminal assembly 24 also includes a terminal housing 40 that defines a first oval-shaped opening 42 and an oval-shaped cavity 44 in which the connection portion 28 is disposed. The connection portion 28 is sized, shaped, and arranged within the cavity 44 to be movable along a lateral axis Y that is perpendicular to the longitudinal axis Z. The oval-shaped cavity 44 provides lateral positional tolerance between the receptacle terminal 26 and the post terminal 22. The terminal housing 40 also defines a pair of slits 46 in the side walls 48 of the cavity 44 that allow the connection portion to also move along a transverse axis X that is perpendicular to both the lateral axis Y and the longitudinal axis Z. These slits 46 provide two degrees of freedom of movement for the connection portion 28, thereby providing additional positional tolerance between the receptacle terminal 26 and the post terminal 22. The receptacle terminal assembly 24 further includes a terminal housing cover 50 defining a second oval-shaped opening 52 attached to the terminal housing 40, thereby enclosing the connection portion 28 within the terminal housing 40. The first oval-shaped opening 42 is aligned with the second oval-shaped opening 52. A slot 54 is formed between the terminal housing 40 and the terminal housing cover 50 through which the attachment portion 34 extends. In example illustrated in FIGS. 7-12, the terminal housing 40 and the terminal housing cover 50 are integrally formed having a living hinge 56 is disposed between the terminal housing 40 and the terminal housing cover 50 formed of a thin section of material between the terminal housing 40 and the terminal housing cover 50. FIGS. 10-12 illustrate a process of assembling the receptacle terminal assembly 24. The receptacle terminal 26 is placed within the cavity 44 and then the hinge 56 is folded to attach the terminal housing cover 50 to the terminal housing 40. The terminal housing cover 50 is secured to the terminal housing 40 by a flexible latch feature 58 located opposite the hinge 56 on the terminal housing cover 50 which engages a ridge or ledge 60 on the terminal housing 40.

Figure 13A:
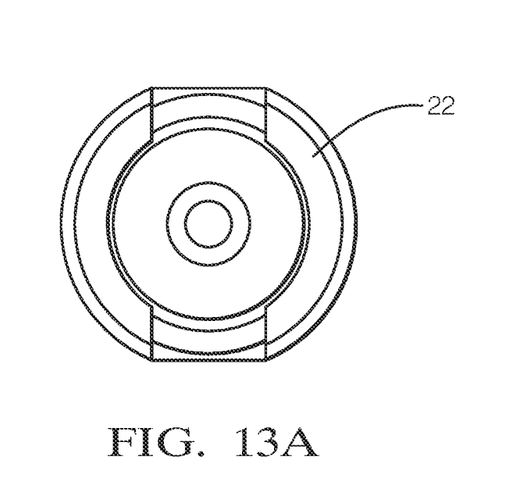
FIG. 13A is a top view of a male post terminal of the electrical connector assembly of FIG. 5 according to the first embodiment of the invention.
Figure 13B:
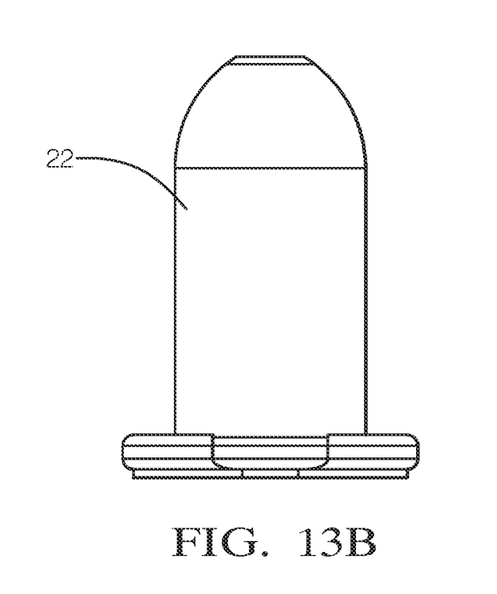
FIG. 13B is a side view of the male post terminal of FIG. 13A according to the first embodiment of the invention.

FIGS. 13A and 13B illustrate an example of the post terminal 22. The post terminal 22 is formed of an electrically conducive material, e.g., a copper-based material. The post terminal 22 is generally cylindrical with a rounded tip and a flat base, thereby giving the post terminal 22 a bullet shape. The post terminal 22 may be a solid piece formed by machining a billet or rod to the desired shape or casting a molten material to the desired shape. Alternatively, the post terminal 22 may be hollow and formed by rolling and stamping sheet metal.

Figure 14:
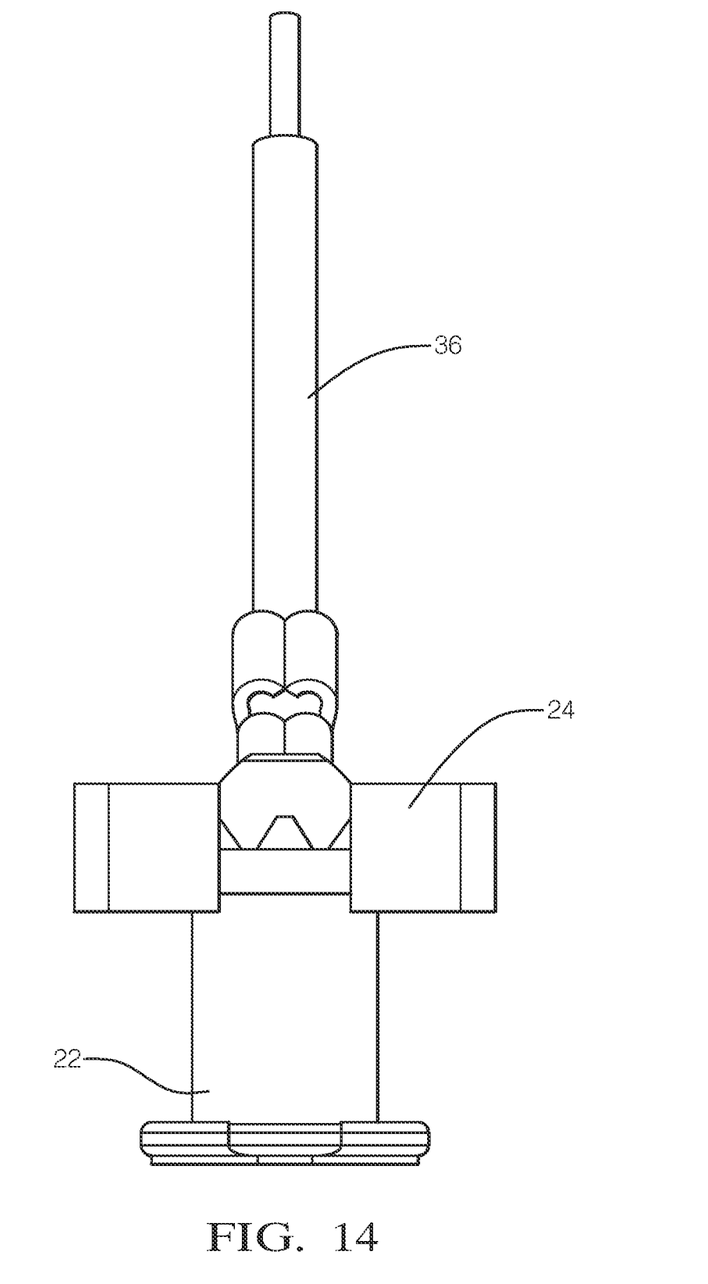
FIG. 14 is a side view of the electrical connector assembly of FIG. 5 in a partially assembled condition according to the first embodiment of the invention.
Figure 15A:
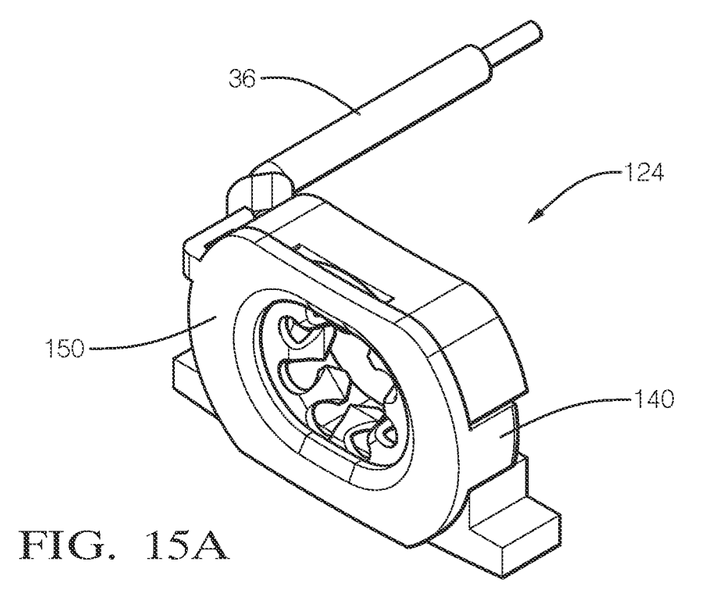
FIG. 15A is a perspective view of a female receptacle terminal assembly in a fully assembled condition according to a second embodiment of the invention.
Figure 15B:
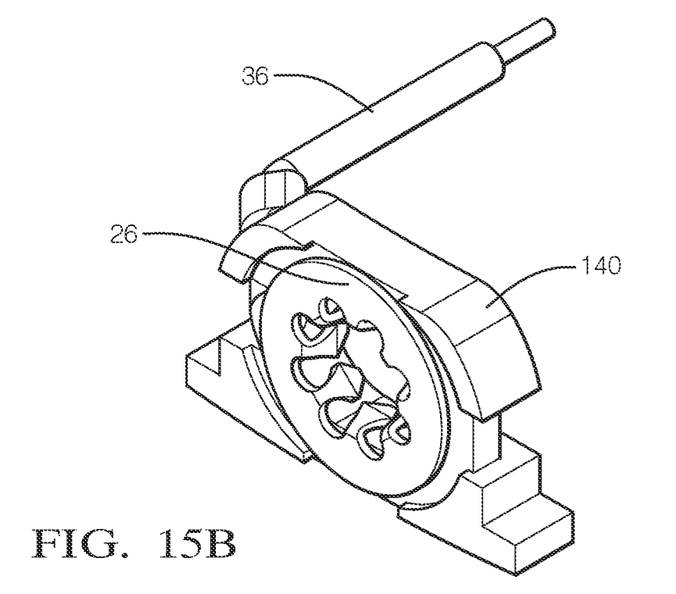
FIG. 15B is a perspective view of the female receptacle terminal assembly of FIG. 15A in a partially assembled condition according to the second embodiment of the invention.
Figure 16A:
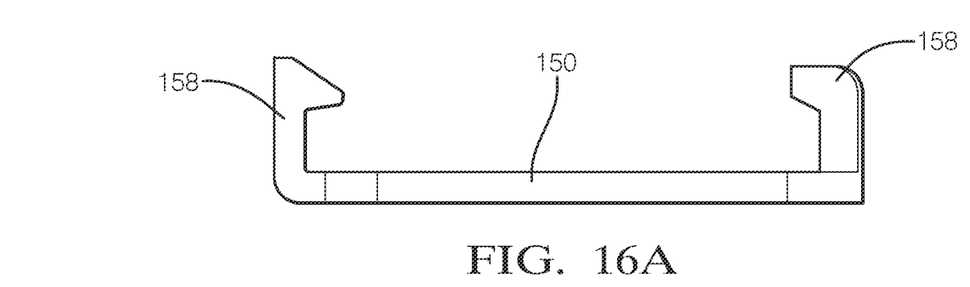
FIG. 16A is a side view of a terminal housing cover of the female receptacle terminal assembly of FIG. 15A according to the second embodiment of the invention.
Figure 16B:
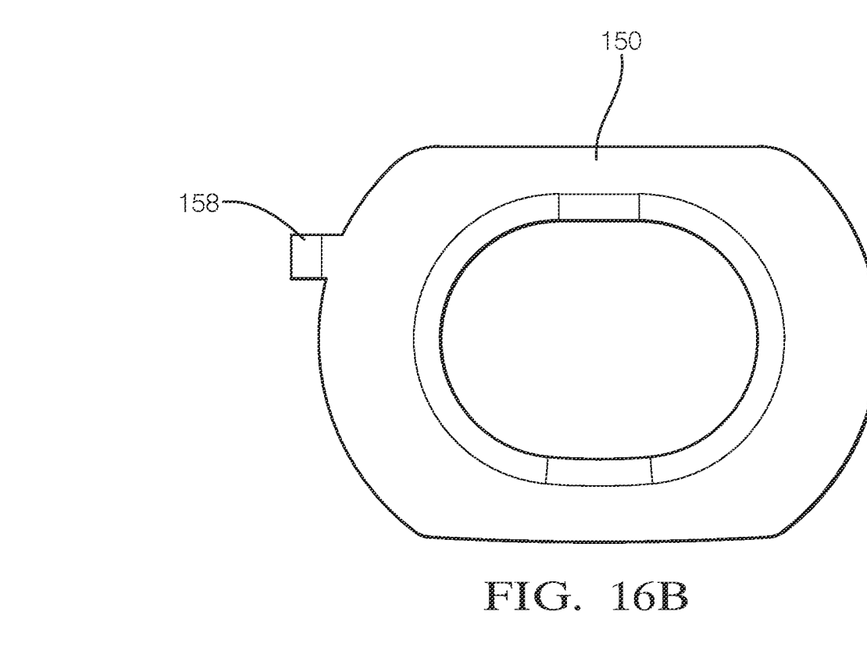
FIG. 16B is a top view of the terminal housing cover of FIG. 16A according to the second embodiment of the invention.
Figure 16C:
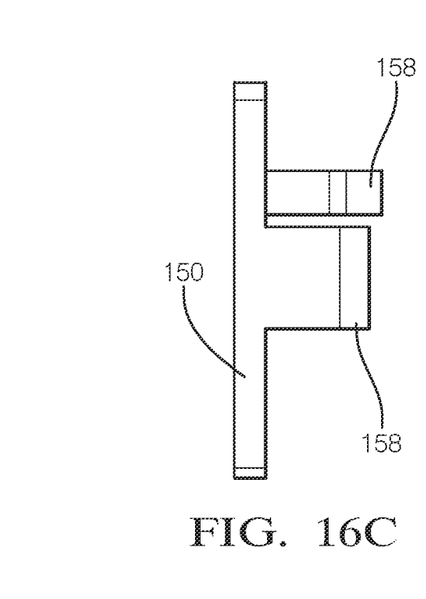
FIG. 16C is an end view of the terminal housing cover of FIG. 16A according to the second embodiment of the invention.

FIG. 14 shows the connector assembly 20 in a partially assembled position. The rounded end of the post terminal 22 contacts and spreads the contact springs 32 of the receptacle terminal 26 so that the contact springs 32 exert a contact force on the post terminal 22 to ensure a reliable and low resistance electrical connection between the post terminal 22 and the receptacle terminal 26.

FIGS. 15A-16C illustrate an alternative design of the receptacle terminal assembly 124. In this design, the terminal housing 140 and the terminal housing cover 150 are two separate pieces and the terminal housing cover 150 is attached to the terminal housing 140 by two flexible latch features 158 that are located on opposite ends of the terminal housing cover 150.

While the illustrated example is a motor vehicle headlight, other embodiments of the invention may be applied to motor vehicle taillights, side marker lights, and center high mounted stop lights. Other embodiments of the invention may be applied to non-automotive applications, such as building security lighting systems. Yet other embodiments for the invention may be applied to non-lighting applications, such as covers for a camera, a radio detection and ranging (RADAR) system, or a light imaging detection and ranging (LIDAR) system.

Accordingly, a lighting assembly 10 including an electrical connector assembly 20 for a heating circuit 18 on the lens 16 and a receptacle terminal assembly 24 for such a lighting assembly 10 is provided. The connector assembly 20 provide a simple push in electrical connection that may be made when coincidentally with installing the lens 16 to the lamp housing 14. The receptacle terminal 26 has two axes on movement within the receptacle terminal assembly 24 providing dimensional tolerance for the electrical connection.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A lighting assembly, comprising:
   a receptacle terminal having a connection portion defining an aperture configured to receive a corresponding plug terminal along a longitudinal axis; and
   a terminal housing defining an opening and a cavity in which the connection portion is disposed, wherein the connection portion is sized, shaped, and arranged within the cavity to be movable along a lateral axis perpendicular to the longitudinal axis.

2. The lighting assembly according to claim 1, further comprising a terminal housing cover defining a second opening attached to the terminal housing and configured to enclose the connection portion.

3. The lighting assembly according to claim 2, wherein the terminal housing and the terminal housing cover are integrally formed.

4. The lighting assembly according to claim 3, wherein a hinge is disposed between the terminal housing and the terminal housing cover.

5. The lighting assembly according to claim 1, wherein the receptacle terminal has an attachment portion configured to attach the receptacle terminal to a wire.

6. The lighting assembly according to claim 1, wherein the connection portion is characterized as having a circular ring shape.

7. The lighting assembly according to claim 1, wherein an attachment portion of the receptacle terminal that is configured to attach the receptacle terminal to a wire is angularly offset relative to the connection portion.

8. The lighting assembly according to claim 1, wherein the connection portion defines a contact spring configured to exert a contact force on the corresponding plug terminal.

9. The lighting assembly according to claim 1, further comprising:
   a lens covering a light source;
   a heating circuit disposed on a surface of the lens and connected to the corresponding plug terminal.

10. The lighting assembly according to claim 9, wherein the light source is a light emitting diode.

11. The lighting assembly according to claim 9, wherein the corresponding plug terminal has a cylindrical body and a rounded tip.

12. The lighting assembly according to claim 11, wherein the connection portion defines a plurality of contact springs arranged about the aperture that are configured to exert a contact force on the corresponding plug terminal.

13. The lighting assembly according to claim 9, wherein the corresponding plug terminal is soldered to the heating circuit.

14. The lighting assembly according to claim 9, wherein the lens has a luminous transmittance greater than or equal to 0.9.

15. The lighting assembly according to claim 9,
    wherein the heating circuit comprises a plurality of radial elements extending from a central portion of the lens.

16. The lighting assembly according to claim 15, wherein the heating circuit comprises a plurality of concentric elements interconnected to the plurality of radial elements.

17. A lighting assembly, comprising:
    a lens covering a light source comprising a light emitting diode;
    a resistive heating circuit disposed on a surface of the lens and connected to a post terminal;
    a receptacle terminal having a connection portion defining an aperture configured to receive the post terminal along a longitudinal axis; and a terminal housing defining an opening and a cavity in which the connection portion is disposed, wherein the connection portion is sized, shaped, and arranged within the cavity to be movable along a lateral axis perpendicular to the longitudinal axis.

18. The lighting assembly according to claim 17, wherein the post terminal is attached to connection pads of the heating circuit by a low temperature solder.

19. The lighting assembly according to claim 17, wherein the post terminal is attached to the heating circuit by process selected from a list consisting of adhering the post terminal to the heating circuit using an electrically conductive adhesive and welding the adhering the post terminal to the heating circuit using a spin welding process.

* * * * *